US008632384B1

(12) United States Patent
Tsung

(10) Patent No.: US 8,632,384 B1
(45) Date of Patent: Jan. 21, 2014

(54) CARD GAME

(76) Inventor: Andy Tsung, El Monte, CA (US)

( * ) Notice: Subject to any disclaimer, the term of this patent is extended or adjusted under 35 U.S.C. 154(b) by 0 days.

(21) Appl. No.: 13/535,357

(22) Filed: Jun. 28, 2012

(51) Int. Cl.
*A63F 13/00* (2006.01)

(52) U.S. Cl.
USPC ........ 463/12; 463/9; 463/10; 463/11; 463/13; 273/292

(58) Field of Classification Search
USPC ........ 463/9, 10, 11, 12, 13; 272/292; 273/292
See application file for complete search history.

(56) References Cited

U.S. PATENT DOCUMENTS 7,918,724 B2 * 4/2011 Walker et al. ................... 463/12
7,993,191 B2 * 8/2011 Evans et al. ..................... 463/13
8,210,919 B2 * 7/2012 Sarabi ............................ 463/11
2008/0113703 A1 * 5/2008 Kekempanos et al. ......... 463/12
2008/0207291 A1 * 8/2008 Van Vuuren .................... 463/12
2011/0272885 A1 * 11/2011 Ma ............................... 273/292
2012/0040729 A1 * 2/2012 Mourad .......................... 463/12

* cited by examiner

*Primary Examiner* — Arthur O. Hall
*Assistant Examiner* — Shahid Kamal
(74) *Attorney, Agent, or Firm* — Raymond Y. Chan; David and Raymond Patent Firm

(57) ABSTRACT

A method of card game includes a main game and a side game. The main game includes the steps of dealing two cards to a banker and each player; determining a hand strength of each two-card hand and categorizing it in one of a highest special hand class, a paired hand class, and a standard hand class; dealing a third card if necessary; determining a hand strength of each three-card hands; ranking the hand strength; and determining a winner of the main game. After the main game is completed, the side game includes the steps of determining a category of the hand of the banker; determining a single valuation card of the banker; determining the point value and suite of the single valuation card; and determining a winner of the side game.

20 Claims, 5 Drawing Sheets

RANK BY SUITES FOR BLACK OR RED THE PAIR ONLY

CARD GAME

BACKGROUND OF THE PRESENT INVENTION

1. Field of Invention

The present invention relates to a card game, and more particularly to a card game involving various playing tactical in one card game.

2. Description of Related Arts

A variety of card games have been used in Game Systems that include poker and a variation on poker. The game of poker is fun but often produces a draw or push. To understand the typical card game system one may categorize the various games systems into three kinds. The first kind is a card game system typical in Las Vegas where the House places a bet and participates in the game by wagering money. The second kind of system is where the House operates by charging a service charge. The third type of system is where the players are casual and players rotate as House, and the House does not require a service charge or place a bet. There are typical House rules that apply in a service charge arrangement. These games are well suited for tournament play.

Numerous card games have existed where players are dealt a number of cards and then have an option of receiving additional cards. The object of such a game is to score a predetermined number of points without going over this predetermined number. A well-known game where the object is to reach a point value of nine without going over this limit is "Baccarat". Traditionally Baccarat card game which generally can be played in a casino-type environment is involved at least one player and a dealer wherein the players are respectively playing against the dealer. Each player invests a desired amount of money in either "Banker" or "Player" of two parties in order to start a particular round of games. In each single game of each round, two cards are dealt to the "Banker" and the "Player" respectively for comparing the total numerical values of the cards therebetween. An additional card may be dealt depending on the total numerical value of two cards of the "Player" and the "Banker" respectively. For example, when the total numerical value of two cards is less than 6, the "Player" must draw the additional card. By comparing the total numerical value of the "Banker" and the "player", the party having a bigger total numerical value will be the winning party. So, the player who invested the amounted of money in the winning party will be paid even money from the dealer. However, in the whole process of the traditional Baccarat card game, none of the players can be assigned as a Host, which may reduce an entertainment environment for the players. Even though the Baccarat is easy to play, all the players in the playing group are not correlated.

In order to enhance the excitement of the card game, a "bonus" bet is given based on the result of the card game. The player optionally places a bet on the bonus bet. However, the bonus bet is only given two options that the player either places the bet or not. In other words, the player has no option to choose any option on the bonus round. For example, a "Pai Gow poker" card game, the player is able to place a bet on the bonus bet that when he or she has a special hand, such as four of a kinds, full house, straight or flush, he or she will win the bonus bet. However, the player cannot choose any option on the bonus bet.

SUMMARY OF THE PRESENT INVENTION

The invention is advantageous in that it provides a card game involving various playing tactical in one card game.

Another advantage of the invention is to provide a card game which is easy to play, full of fun and excited. Accordingly, the card game of the present invention is operated at least one player or up to eight players. Preferably, at least two players should join the card game.

Another advantage of the invention is to provide a card game which provides a main game and a side game play therewith, such that the players are able to place the bets on both main and side games to enhance the excitement of the card game.

Additional advantages and features of the invention will become apparent from the description which follows, and may be realized by means of the instrumentalities and combinations particular point out in the appended claims.

According to the present invention, the foregoing and other objects and advantages are attained by a method of playing a card game which comprises the steps of:

(a) providing a main game; and (b) providing a side game with the main game.

Accordingly, the main game is played by the step of:

(a.1) shuffling a standard deck of 52 cards plus four Joker cards;

(a.2) dealing two cards to the banker and each of the players in a round to form a two-card hand;

(a.3) determining a hand strength of each of the two-card hands;

(a.4) dealing a third card to the two-card hand to form a third card hand if necessary;

(a.5) determining a hand strength of the three-card hand;

(a.6) ranking the hand strength; and (a.7) determining a winner of the main game between the banker and the player by comparing the hand strength between the banker and the player.

The side game is played by the steps of:

(b.1) determining a category of the hand of the banker;

(b.2) determining a highest value of the card of the banker as a single valuation card;

(b.3) determining the point value and suite of the single valuation card of the banker; and (b.4) determining a winner of the side game in the round who places a bet on a banker's match.

In accordance with another aspect of the invention, the present invention comprises a game table for playing a card game, which comprises a tabletop having a main game section at a peripheral portion of the tabletop and a side game section at a center portion of the tabletop, and eight sitting positions for eight players playing the main and side games. The tabletop further has eight main game betting areas formed at the main game section and a plurality of banker's match categorizing betting areas formed at the side game section, wherein the player is able to place the bet on the respective main game betting area for playing the main game and is able to place the bet on one or more banker's match categorizing betting areas for playing the side game.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The game begins with a game set up. The game is played at a table with a standard deck of 52 cards plus four Joker cards, wherein the deck of cards includes four suits of each of an ace, 2-10 cards, a Jack, a Queen and a King. The suites are spades, hearts, diamonds, and clubs. The card game of the present invention involves a main game and a side game playing along with the main game. In the card game, each player attempts to defeat the banker who may be the casino dealer or one of the players at the table. Accordingly, one of the players is assigned to be the banker in turn such the every players at the table will have a chance to become the banker. Alternatively, the casino dealer (dealer) will be the banker such that all players attempt to defeat the dealer.

The Rankings System

As used herein, the following abbreviations apply where A stands for Ace, K stands for King, Q stands for Queen, J stands for Jack, and T stands for 10. A dash between letters and digits stands for a set of two cards.

The hand strength of a hand is categorized as a highest special hand class, a paired hand class, and a standard hand class. In the highest special hand class, two cards in hand are two Joker cards. In the paired hand class, two cards in hand are formed in pair. In the standard hand class, the cards in hand are valued by a point total criteria, wherein a point total of the cards equals a unit digit of a sum of a numerical value of the cards. Therefore, the highest point value of a hand is 9 and the lowest point value of a hand is zero. The hand strength of the highest special hand class is higher than the hand strength of the paired hand class which is higher than the hand strength of the standard hand class.

Figure 3:
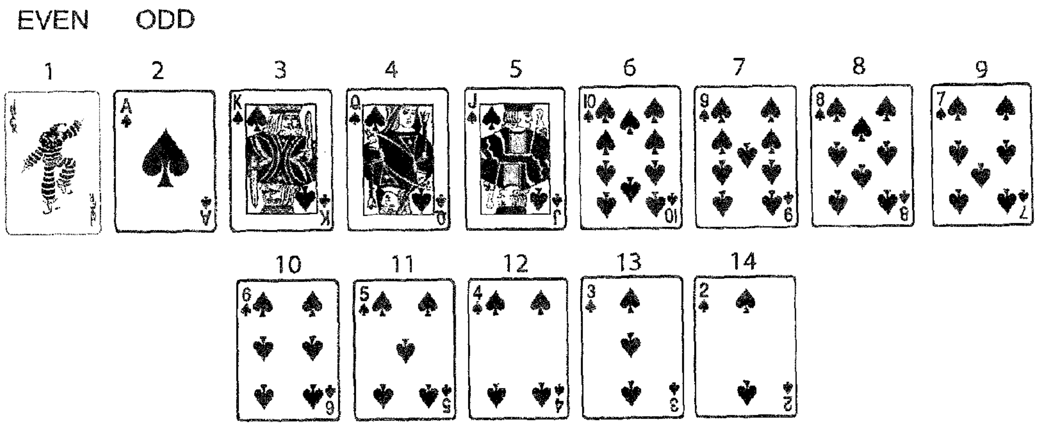
FIG. 3 is an individual ranking for a single card for playing the card game according to the above preferred embodiment of the present invention.
Figure 5:
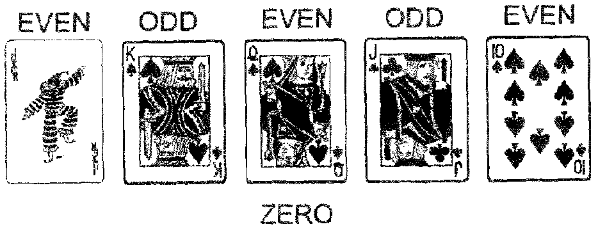
FIG. 5 illustrates the preset odd and even numbers for Joker, King, Queen, Jack and 10 cards for playing the card game according to the above preferred embodiment of the present invention.

FIG. 3 illustrates the individual ranking of the cards, wherein the hand strengths of cards is ranked in the following order from highest to lowest: Joker, A, K, Q, J, 10, 9, 8, 7, 6, 5, 4, 3, 2. The cards 2 to 9 are worth face value. Aces are worth one point. The card 10, Jack, Queen, King, and Joker card are worth zero as shown in FIG. 5. The total point value of a hand, including a two-card hand or a three-card hand, is determined by taking the single digit of the total face value of the cards. For example, the point value of a hand of Jack-9 will be 9 (0+9). The point value of a hand of 2-5-6 will be 3 (2+5+6=13; 13−10=3).

Figure 4:
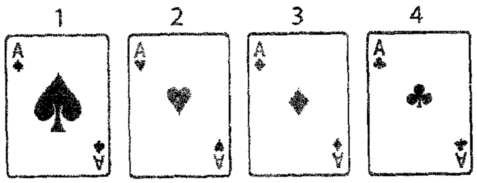
FIG. 4 is a suite ranking of the cards for playing the card game according to the above preferred embodiment of the present invention.

As shown in FIG. 4, the suites of the cards have different hand strength in the paired hand class only that the hand strength of spades is higher than the hand strength of hearts which is higher than the hand strength of diamonds which is higher than the hand strength of clubs. In other words, the suites of the cards have the same hand strength in the standard hand class.

Figure 6:
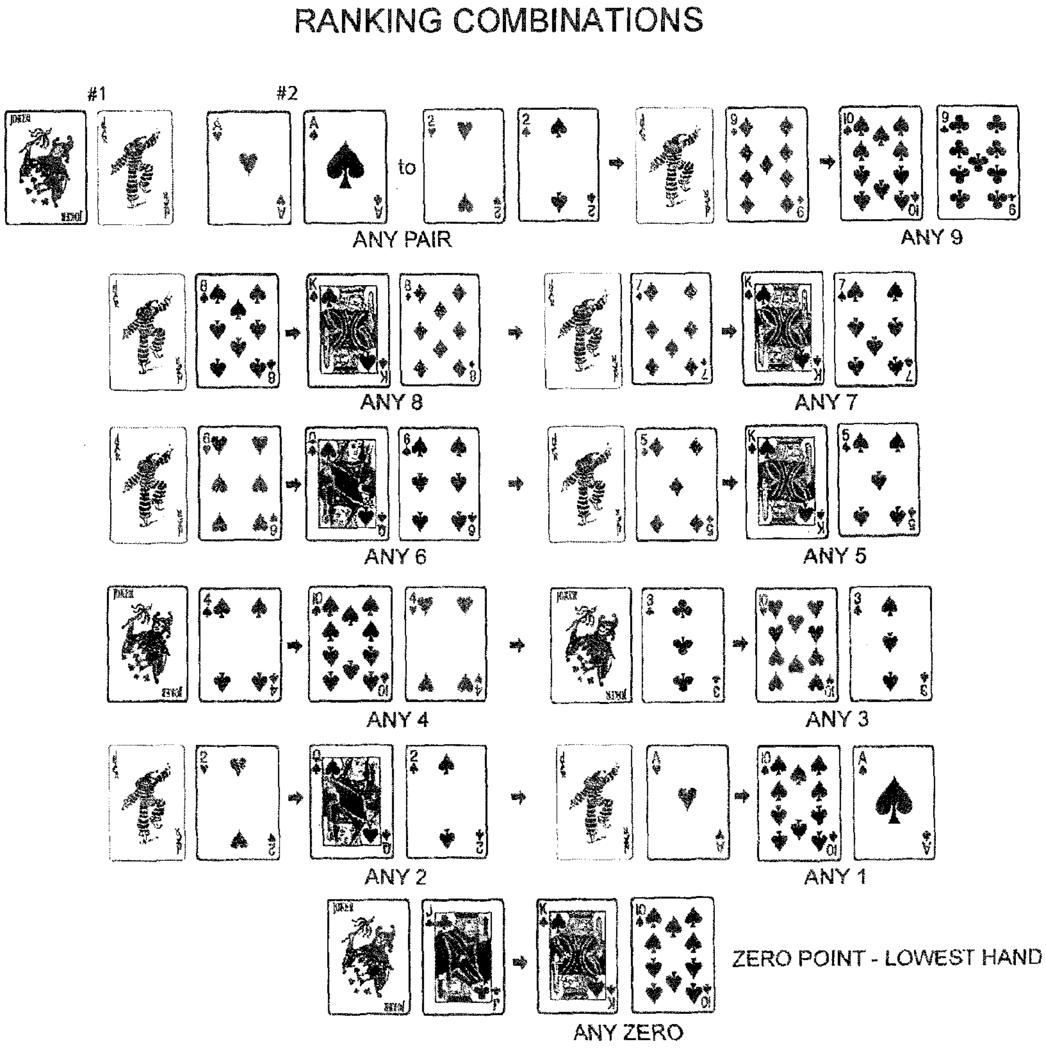
FIG. 6 illustrates the ranking combinations for playing the card game according to the above preferred embodiment of the present invention.

As shown in FIG. 6, the hand strength of the paired hand class is ranked in the following order from highest to lowest: A-A, K-K, Q-Q, J-J, T-T, 9-9, 8-8, 7-7, 6-6, 5-5, 4-4, 3-3, 2-2. It is worth mentioning that when there are two Joker cards in a hand of the player/banker, the two Joker cards are not categorized in the paired hand class. The two Joker cards are categorized in the highest special hand class.

In FIG. 5, the hand strength of the standard hand class is ranked that when the hand of cards contains the Joker card, the Joker card will be the "kicker" to win against the hand without the Joker card when the point values of the player and the banker are the same.

FIG. 6 further illustrates the hand strength of the card combination. In FIG. 5, "ANY 3" means the point value of the hand is 3 without the Joker card. There are different combinations of the cards to have the point value of 3. For example, a hand of J-3 is 3. A hand of A-2 is 3. A hand of 3-2-8 is 3. Therefore, the hand strength of a hand of Joker-3 is higher than the hand strength of a hand of "any 3".

Game Configuration

Figure 1:
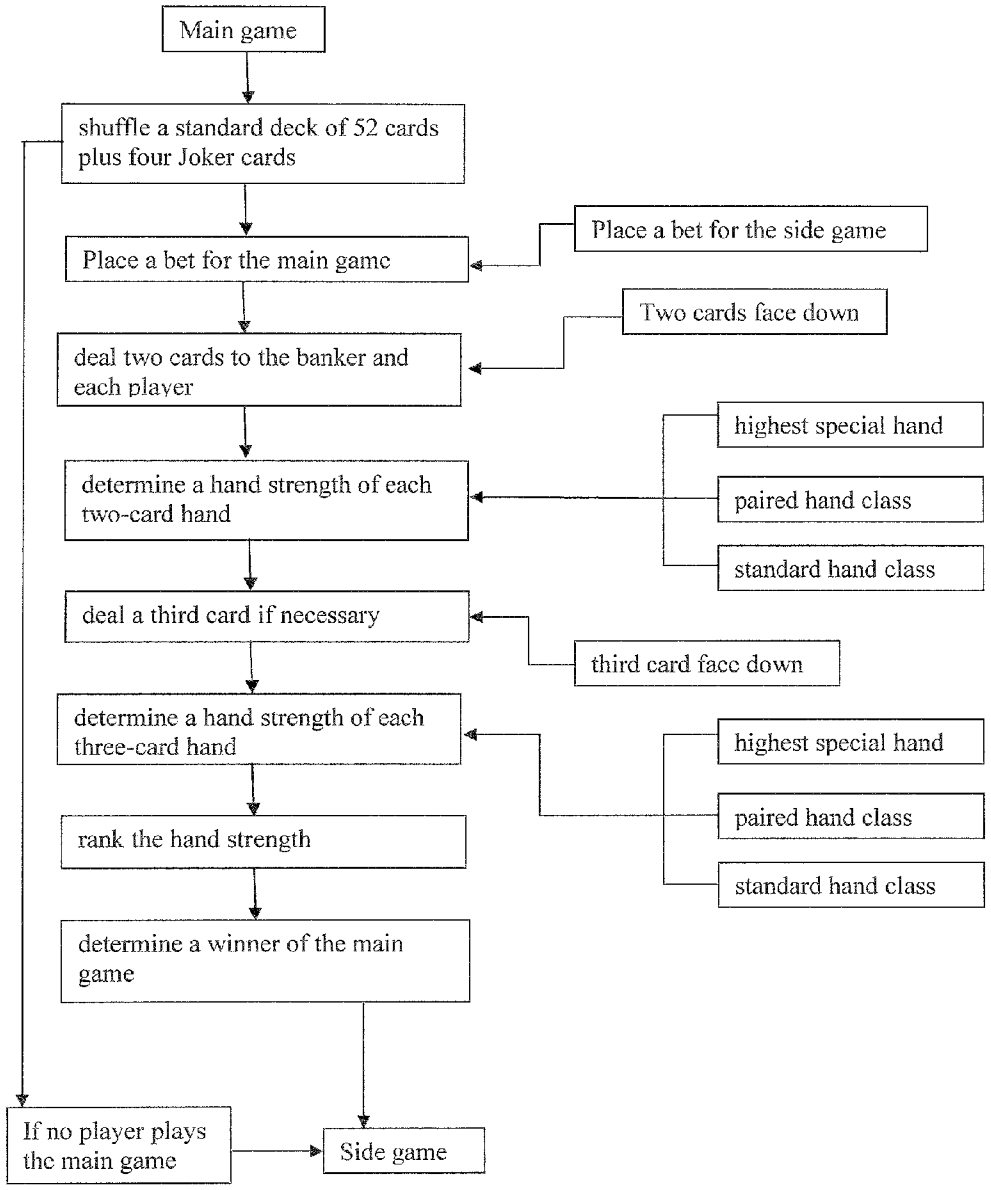
FIG. 1 is a flow diagram illustrating the method of playing a main game of a card game according to a preferred embodiment of the present invention.

As shown in FIG. 1, the main game is played by the following steps.

(1) Shuffle the standard deck of 52 cards plus four Joker cards. The cards can be shuffled by machine or hand. After the cards are shuffled, the cards can be placed in the shoe for dealing or can be dealt by hand.

(2) Place a bet by each player. Each player is able to place a predetermined bet if there is no bet limit. If the banker is not assigned by one of the player, the banker will also place a bet at the same time. If the banker is the dealer, the banker is not required placing any bet.

(3) Deal two cards to the banker and each of the players in a round to form a two-card hand. Each player and the banker will have a hand of two cards initially. Preferably, the two cards are dealt in a face down manner. The card will be dealt to a participant assigned as a starting first position. In other words, when the player sits at the first betting position, the first card is dealt thereto. The first card is dealt to the starting player in a face down manner. After the first cards are dealt to all players including the banker, the second card will be dealt to the starting player in a face down manner until two face down cards are dealt to each player.

(4) Determine the hand strength of each of the two-card hands. Each player is able to check the two cards in a face down manner to determine the hand strength thereof without exposing the cards to the others. The hand strength of the two-card hand is categorized as the highest special hand class, the paired hand class, and the standard hand class. The two cards in the two-card hand are two Joker cards and are categorized in the highest special hand class. The two cards in the two-card hand are formed in pair and are categorized in the paired hand class. The two cards in the two-card hand are valued by the point total criteria in the standard hand class.

(5) Deal a third card to the two-card hand to form a third card hand if necessary. The third card is dealt in face down manner. Accordingly, only in the standard hand class, if the point total of the two-card hand is lesser than a pre-set criteria, the third card is dealt to the two-card hand to form the third card hand. In other words, if the two-card hand of the player/banker is categorized in either the highest special hand class or the paired hand class, the third card will not be dealt to the respective player/banker.

In the step (5), the pre-set criteria is set that the banker must draw the third card with the point value between zero and five and the banker will stand with the point value with either six or seven. In other words, if the banker has an initial total of 0-5 in the two-card hand, the banker must draw the third card.

It is worth mentioning that when two cards in the two-card hand are initially formed the highest special hand class or the paired hand class, the third card will not be dealt.

(6) Determine the hand strength of the three-card hand after the cards are faced up. The hand strength of the three-card hand is also categorized as the highest special hand class, the paired hand class, and the standard hand class. Two of the three cards in the three-card hand are two Joker cards and are categorized in the highest special hand class, wherein the non-Joker card will be ignored. Two of the three cards in the three-card hand are formed in pair and are categorized in the paired hand class, wherein the non-paired card will be ignored. The three cards in the three-card hand are valued by the point total criteria in the standard hand class.

In the standard hand class, the hand of cards, i.e. including the two-card hand and the three-card hand, contains the Joker card, the Joker card will be the "kicker" to win against the hand without the Joker card when the point values of the player and the banker are the same.

(7) Rank the hand strength between the banker and the player no matter what they have the two-card hand or the three-card hand.

(8) Determine a winner of the main game between the banker and the player by comparing the hand strength between the banker and the player. When the hand strength of the banker is higher than the hand strength of the player, the banker wins the main game. When the hand strength of the player is higher than the hand strength of the banker, the player wins the main game.

Figure 2:
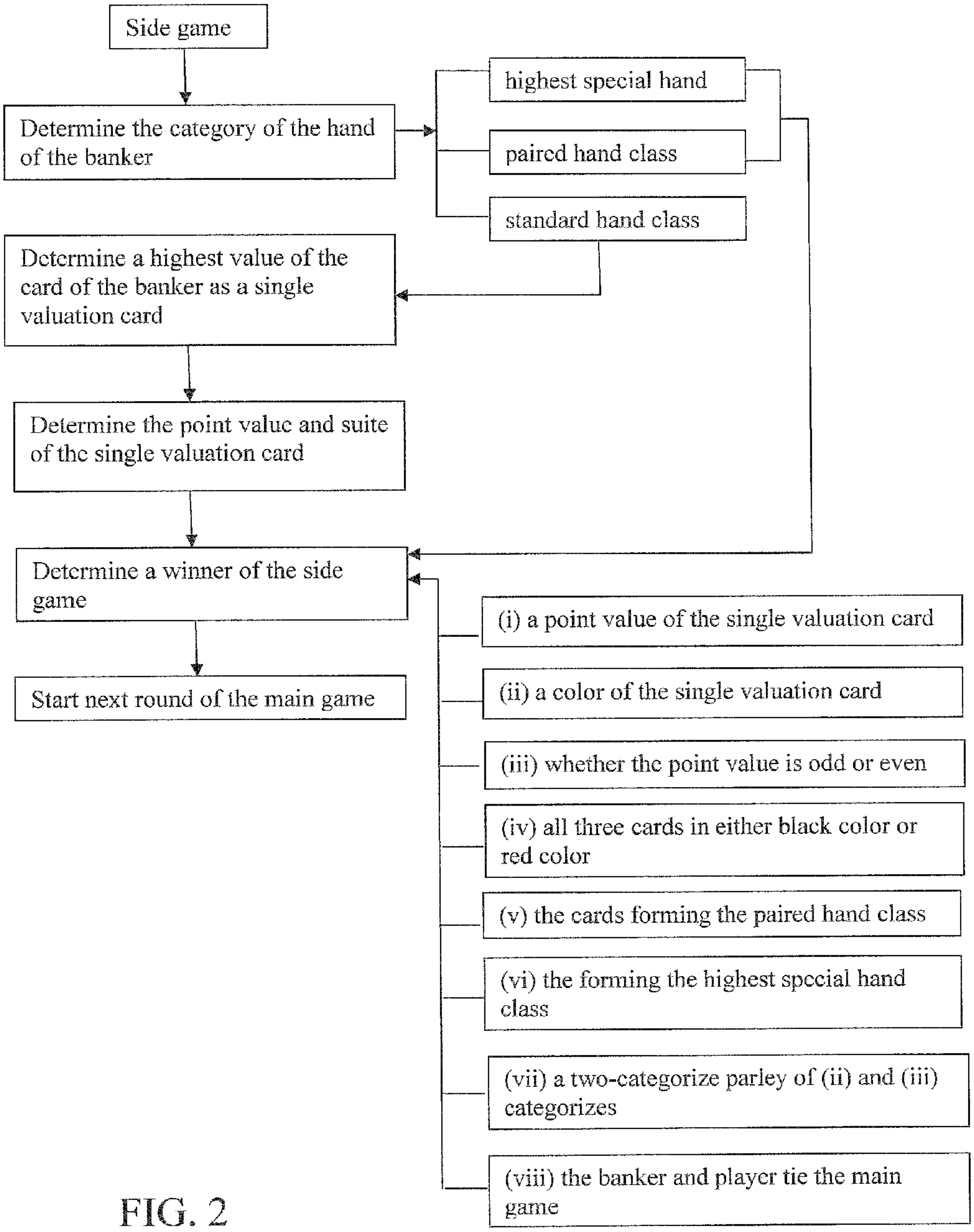
FIG. 2 is a flow diagram illustrating the method of playing the side game of the card game according to the above preferred embodiment of the present invention.

After the main game is completed, i.e. the winner is determined, the side game will then be played. As shown in FIG. 2, the side game is played by the steps of:

(A) Determine the category of the hand of the banker. Accordingly, the hand of the banker is one of the highest special hand class, the paired hand class, and the standard hand class.

(B) Determine a highest value of the card of the banker as a single valuation card when the hand of the banker is categorized in the standard hand class. When the banker has a two-card hand, the highest value of the card in the two-card hand will be determined as the single valuation card. When the banker has a three-card hand, the highest value of the card in the three-card hand will be determined as the single valuation card. The individual ranking of the cards is shown in FIG. 3. When the two-card hand or three-card hand of the banker is categorized in either the highest special hand class or the paired hand class, there is no single valuation card.

(C) Determine the point value and suite of the single valuation card of the banker. Once the single valuation card is determined, the point value of the single valuation card is the face value thereof.

(D) Determine a winner of the side game in the round who places a bet on a banker's match. According to the preferred embodiment, the banker's match option which has (i) a point value of the single valuation card, (ii) a color of the single valuation card, (iii) whether the point value is odd or even, (iv) all three cards of the banker in either black color or red color, (v) the cards of the banker forming the paired hand class, (vi) the cards of the banker forming the highest special hand class, (vii) a two-categorize parley of (ii) and (iii) categorizes, and (viii) the banker and player tie the main game.

According to the preferred embodiment, the player is able to place the bet at one of the choices of the banker's match option in order to win the side game. Preferably, the player is able to place more than one bets at different choices of the banker's match option. In addition, the banker is allowed to place any bet at the banker's match. It is worth mentioning that the bets for the side game are placed at the same time when the bet is placed for the main game in the step (2). Only for casino provision, the banker is prohibited to place any bet at the banker's match.

For the first choice, the point value of the single valuation card is the face value of the highest value of the card of the banker. The cards 2 to 9 are worth face value. Aces are worth one point. The card 10, Jack, Queen, King, and Joker card are worth zero.

According to the preferred embodiment, the point value range of the single valuation card is set between 1 and 9 to be bet. Therefore, the player can only bet on the point value of the single valuation card from 1 to 9. In other words, the player cannot bet on the point value of the single valuation card as zero point. When the point value of the single valuation card is zero, i.e. Joker, K, Q, J, 10, the player will lose the side game if he or she places the bet on the option of (i) point value of the single valuation card.

For the second choice, the color of the single valuation card is the suite of the highest value of the card of the banker in either black or red color. The suites of spades and clubs are formed in black color. The suites of hearts and diamonds formed in red color. In addition, two Joker cards are set in red color while another two Joker cards are set in black color. In order to distinguish the color of the Joker card, the red and black Joker cards will have different characters printed thereon. The character of the red Joker card will be in red color while the character of the black Joker card will be in black color as well.

For the third choice, the player is able to choose point value of the single valuation card is either an even or odd number. The point value of Ace is set as odd number. The point values of King and Jack are set as odd number. The point value of Queen is set as even number. The point values of cards 10, 8, 6, 4, 2 are set an even number. The point values of cards 9, 7, 5, 3 are set as odd number. The point values of four Joker cards are set as even number. Therefore, in 56 cards, 28 cards are set as even number and 28 cards are set as odd number.

For the fourth choice, the banker must have the three-card hand. In addition, all three cards of the banker in either black color or red color. In other words, the player is able to place the bet at either all three cards of the banker in black color or all three cards of the banker in red color.

For the fifth choice, the banker can have either the three-card hand or the two-card hand to form the paired hand class, i.e. containing two cards in pair.

For the sixth choice, the banker can have either the three-card hand or the two-card hand to form the highest special hand class, i.e. containing two Joker cards.

The banker's match option has the seventh choice of (vii) a two-categorize parley of (ii) and (iii) categorizes. The player is able to place a single bet that links the (ii) and (iii) categorizes and is dependent on all of those categorizes winning together. In other words, the player must place the bet to link (ii) the color of the single valuation card and (iii) whether the point value is odd or even together.

For the eighth choice, the player is able to a bet on a tie game. The player will win the side game on the eighth choice when the banker and player tie the main game. It is worth mentioning that the tie game is only related between the banker and the respective player in the main game.

According to the preferred embodiment, the side game can be played alone without the main game in condition that no player plays the main game. In other words, if there is no player involves the main game, a single hand of the banker is set to play the side game alone. The dealer will only deal two cards as the hand of the banker to form the two-card hand thereof. A third card will be dealt if necessary. All players will only play the side game in response to the hand strength of the banker.

After the main and side games are completed, i.e. the winners thereof are determined, the position of the banker will shift to the next player in a clockwise direction. Preferably, each player will have two sequent rounds to become the banker. For casino provision, the dealer will always be the banker.

Game Strategy

The following examples will provide additional detail regarding the general strategy of the game. The following examples will also provide a simplified game strategy between one banker and one player in order to illustrate the principle of the present invention. It should be appreciated that the card game involves one banker and a plurality of players.

Example 1

Player's Hand: J♠ -3♦; Banker's Hand: K♣ -8♦

In example 1, for the main game, the two-card hand of the player is categorized in the standard hand class, wherein the hand strength thereof is zero point (J)+3=3. Therefore, a third card is dealt to the player. Assume the third card is 8♠, the hand strength of the three-card hand is 0 (j)+3+8=11. Therefore, by taking the single digit of the point value, the point value of the three-card hand of the player is 1.

The two-card hand of the banker is categorized in the standard hand class, wherein the hand strength thereof is zero point (K)+8=8. Therefore, a third card will not be dealt to the Banker. The point value of the two-card hand of the banker is 8. As a result, the banker wins the main game.

For the side game, the single valuation card of the banker is K♣, which is odd number and black color. Therefore the player, placing the bet at the options of odd number, black color, and/or the parley of odd number and black color, will win the side game. The player, placing the bet at the rest of the options, will lose the side game.

Example 2

Player's Hand: Joker(Red)-2♥; Banker's Hand: Joker(Black)-Joker(Black)

In example 2, for the main game, the two-card hand of the player is categorized in the standard hand class, wherein the hand strength thereof is zero point (Joker)+2=2. Therefore, a third card is dealt to the player. Assume the third card is Joker(red), the hand strength of the three-card hand is categorized in the highest special hand class with two Joker cards.

The two-card hand of the banker is categorized in the highest special hand class with two Joker cards. Therefore, a third card will not be dealt to the Banker. As a result, the banker and the player tie the main game.

For the side game, the hand of the banker is categorized in the highest special hand class. Therefore, the player, only placing the bet at the option (vi) the cards of the banker forming the highest special hand class and/or (viii) tie game, will win the side game. The player, placing the bet at the rest of the options, will lose the side game.

Example 3

Player's Hand: 3♠ -3♦; Banker's Hand: 9♣ -2♦

In example 3, for the main game, the two-card hand of the player is categorized in the paired hand class. Therefore, a third card will not be dealt to the player.

The two-card hand of the banker is categorized in the standard hand class, wherein the hand strength thereof is 9+2=11, such that the point value of the two-card hand is 1. Therefore, a third card is dealt to the banker. Assume the third card is 4♦, the hand strength of the three-card hand is 9+2+4=15. Therefore, by taking the single digit of the point value, the point value of the three-card hand of the player is 5. As a result, the player wins the main game.

For the side game, the single valuation card of the banker is 9♣, which is odd number and black color. Therefore, the player, placing the bet at the options of point value of the single valuation card=9, odd number, black color, and/or the parley of odd number and black color, will win the side game. The player, placing the bet at the rest of the options, will lose the side game.

Example 4

Player's Hand: 3♠ -3♦; Banker's Hand: 3♣ -2♦

In example 4, for the main game, the two-card hand of the player is categorized in the paired hand class. Therefore, a third card will not be dealt to the player.

The two-card hand of the banker is categorized in the standard hand class, wherein the hand strength thereof is 3+2=5, such that the point value of the two-card hand is 5. Therefore, a third card is dealt to the banker. Assume the third card is 3♥, the hand strength of the three-card hand is categorized in the paired hand class with a pair of 3. According to the paired hand class, the hand strength of spades is higher than the hand strength of hearts. As a result, the player wins the main game.

For the side game, the hand of the banker is categorized in the paired hand class. Therefore the player, placing the bet at the option (v) the cards of the banker forming the paired hand class, will win the side game. The player, placing the bet at the rest of the options, will lose the side game.

Example 5

Player's Hand: Q♠ -3♦; Banker's Hand: 3♣ -2♣

In example 5, for the main game, the two-card hand of the player is categorized in the standard hand class, wherein the hand strength thereof is 0+3=3, such that the point value of the two-card hand is 3. Therefore, a third card is dealt to the player. Assume the third card is 4♦, the hand strength of the three-card hand is 0+3+4=7. Therefore, the point value of the three-card hand of the player is 7.

The two-card hand of the banker is categorized in the standard hand class, wherein the hand strength thereof is 3+2=5, such that the point value of the two-card hand is 5. Therefore, a third card is dealt to the banker. Assume the third card is 6♠, the hand strength of the three-card hand is 3+2+6=11. Therefore, by taking the single digit of the point value, the point value of the three-card hand of the banker is 1. As a result, the player wins the main game.

For the side game, the hand of the banker is categorized in the standard hand class with all three cards in black color. The single valuation card of the banker is 6♠, which is odd number and black color. Therefore, the player, placing the bet at the options of point value of the single valuation card=6, even number, black color, all three cards of the banker in black color, and/or the parley of even number and black color, will win the side game. The player, placing the bet at the rest of the options, will lose the side game.

Example 6

Banker's Hand: Joker(Black)-2♥; Player's Hand: 4 ♣ –3♥

In example 6, for the main game, the two-card hand of the banker is categorized in the standard hand class, wherein the hand strength thereof is zero point (Joker)+2=2. Therefore, a third card is dealt to the player. Assume the third card is 5♦, the hand strength of the three-card hand is 0+2+5=7. Therefore, the point value of the three-card hand of the banker is 7.

The two-card hand of the player is categorized in the standard hand class, wherein the hand strength thereof is 4+3=7. Therefore, a third card will not be dealt to the player. The point value of the player equal to the point value of the banker. However, the banker has the Joker card as a kicker. As a result, the banker wins the main game.

For the side game, the hand of the banker is categorized in the standard hand class, wherein the single valuation card of the banker is Joker(black), which is even number and black color. Therefore, the player, placing the bet at the options of point value of the single valuation card=7, even number, black color, and/or the parley of even number and black color, will win the side game. The player, placing the bet at the rest of the options, will lose the side game.

Figure 7:
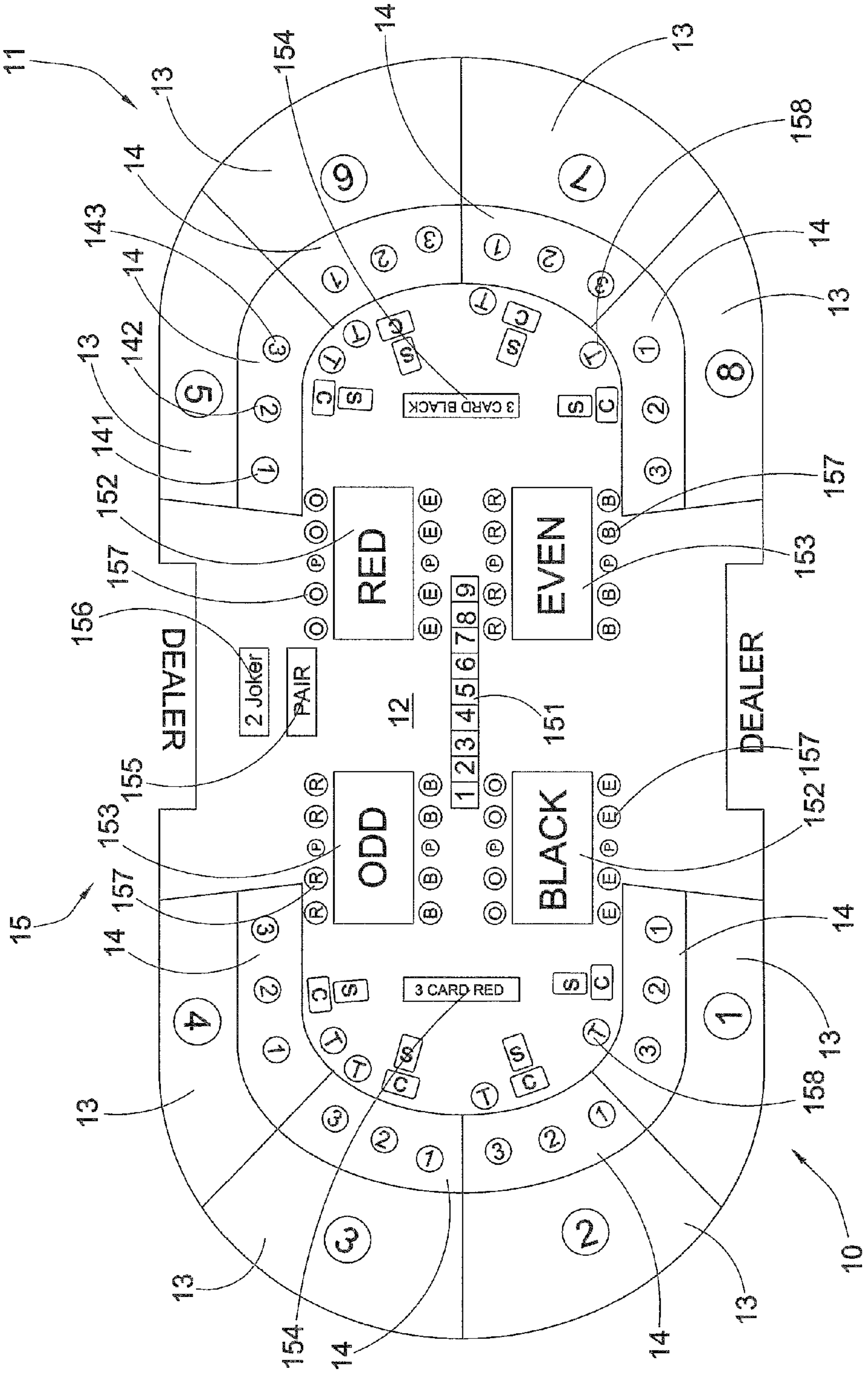
FIG. 7 is a layout of the game table for playing the card game according to the above preferred embodiment of the present invention.

As shown in FIG. 7, the present invention further provides a game table for playing a card game, wherein the game table which comprises a tabletop 10 having a main game section 11 at a peripheral portion of the tabletop 10 and a side game section 12 at a center portion of the tabletop 10, and eight sitting positions 13 for eight participants playing the main and side games. The participants will become the players of the card game of the present invention.

The tabletop 10 further has eight main game betting areas 14 formed at the main game section 11 and a plurality of banker's match categorizing betting areas 15 formed at the side game section 12, wherein the player is able to place the bet on the respective main game betting area 14 for playing the main game and is able to place the bet on one or more banker's match categorizing betting areas 15 for playing the side game.

According to the present invention, the banker's match categorizing betting areas 15 contains the area 151 of (i) a point value of the single valuation card, the area 152 of (ii) a color of the single valuation card, the area 153 of (iii) whether the point value is odd or even, the area 154 of (iv) all three cards of the banker in either black color or red color, the area 155 of (v) the cards of the banker forming the paired hand class, the area 156 of (vi) the cards of the banker forming the highest special hand class, the area 157 of (vii) a two-categorize parley of (ii) and (iii) categorizes; and the area 158 of (viii) the banker and the player tie the main game.

Accordingly, in order to play the main game, the players should sit at the sitting positions 13 respectively. In addition, the players are able to play the main and/or side games when they are not sitting at any one of the sitting positions 13. It is worth mentioning that the area 158 of (viii) the banker and the player tie the main game is configured between the banker and the respective player. For example, the tie game area 158 at the second betting position is configured only between the banker and the player who sits at the second betting position.

At each of the sitting positions 13, the tabletop 10 further has a "card" area C and a "stay" area S, wherein the player is able to place the two-card hand at either the "card" area C or the "stay" area S. When the two-card hand is placed at the "card" area C, the third card will be dealt to the player. When the two-card hand is placed at the "stay" area S, the third card will not be dealt to the player. Therefore, the dealer will notify whether the player wants the third card or not by placing the two-card hand at either the "card" area C or the "stay" area S.

Only the players sitting at sitting positions 13 will have the right to touch the cards and to make a decision of whether the third card is dealt or not. In each of the main game betting areas 14, there are three betting priority spots 141, 142, 143. The player sitting at the sitting position 13 will have the first priority to place the bet at the first betting priority spot 141. The player not sitting at the sitting position 13 will place the bet at the second or third betting priority spot 142, 143. When the player wins the main game, the player sitting at the sitting position 13 will have the first priority to collect the award. The player placing the bet at the second betting priority spot 142 will collect the award thereafter.

For casino provision, the tabletop 10 further has two dealer positions 16 located at two opposite sides of the tabletop 10. Since the card game contains the main game and the side game, two dealers may be required. One dealer will shuffle and deal the cards to the players while another dealer will determine the winners of the main and side games. It is worth mentioning that the banker will become the banker for casino provision.

It is appreciated that the 56 cards played in the card game of the present invention can be electronic cards that the game table is configured as an electronic game machine to display the tabletop 10 on the screen of the electronic game. The player can play the card game through the electronic machine in the casino or at home by means of communication network such as Internet as an online card game. The dealer will be the assigned by a computerized dealer.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of playing a card game between a banker and a plurality of players, comprising the steps of:

(a) enabling said banker and said player to play a main game through a game machine by the steps of:

(a.1) said game machine shuffling a standard deck of 52 cards plus four Joker cards, wherein said deck of cards includes a standard four suits of each of an ace, 2-10 cards, a Jack, a Queen, and a King;

(a.2) said game machine dealing two cards to said banker and each of said players in a round to form a two-card hand;

(a.3) said game machine determining a hand strength of each of said two-card hands, wherein said two cards in said two-card hand are categorized in one of a highest special hand class, a paired hand class, and a standard hand class, wherein in said highest special hand class, said two cards in said two-card hand are two Joker cards, wherein in said paired hand class, said two cards in said two-card hand are formed in pair, wherein in said standard hand class, said two cards are valued by a point total criteria, wherein a point total of said two cards of said two-card hand equals a unit digit of a sum of a numerical value of said two cards that said cards 2 to 9 are worth face value, aces are worth one point, card 10, Jack, Queen, King, and Joker card are worth zero;

(a.4) in said standard hand class, if said point total of said two-card hand is lesser than a pre-set criteria, said game machine dealing a third card to said two-card hand to form a third card hand;

(a.5) said game machine determining a hand strength of said three-card hand by forming said standard hand class that numerical values of said three cards of said three-card hand are sum, by forming said paired hand class with two of three cards in said three-card hand, or by forming said highest special hand class with two Joker cards in said three-card hand;

(a.6) said game machine ranking said hand strength of said highest special hand class higher than said hand strength of said paired hand class which is higher than said hand strength of said standard hand class, wherein said hand strength of said paired hand class is ranked in the following order from highest to lowest: A-A, K-K, Q-Q, J-J, T-T, 9-9, 8-8, 7-7, 6-6, 5-5, 4-4, 3-3, 2-2, wherein said hand strength of said standard hand class is ranked according to said point value; and (a.7) said game machine determining a winner of said main game between said banker and said player by comparing said hand strength between said banker and said player, wherein when said hand strength of said banker is higher than said hand strength of said player, said banker wins said main game, wherein when said hand strength of said player is higher than said hand strength of said banker, said player wins said main game; and (b) enabling said banker and said player to play a side game with said main game through said game machine, which comprises the steps of:

(b.1) said game machine determining a category of said hand of said banker in one of said highest special hand class, said paired hand class, and said standard hand class;

(b.2) when said hand of said banker is categorized in said standard hand class, said game machine determining a highest value of said card of said banker as a single valuation card, wherein said hand strength of said card is ranked in the following order from highest to lowest, Joker, Ace, King, Queen, Jack, 10, 9, 8, 7, 6, 5, 4, 3, 2;

(b.3) said game machine determining said point value and suite of said single valuation card of said banker, wherein said suites of spades and clubs are categorized in black color, wherein said suites of hearts and diamonds are categorized in red color; and (b.4) said game machine determining a winner of said side game in said round who places a bet on a banker's match option which has (i) a point value of said single valuation card, (ii) a color of said single valuation card, and (iii) whether said point value is odd or even.

2. The method, as recited in claim 1, wherein two of said Joker cards are set in red color while another two said Joker cards are set in black color.

3. The method, as recited in claim 1, wherein said suites of said cards have the same hand strength in said standard hand class.

4. The method, as recited in claim 1, wherein said suites of said cards have different hand strength in said paired hand class that said hand strength of spades is higher than said hand strength of hearts which is higher than said hand strength of diamonds which is higher than said hand strength of clubs.

5. The method, as recited in claim 1, before the step (a.2), further comprising a step of placing a bet by each of said players for said main game, wherein said bets for said side game are placed at the same time when said bet is placed for said main game.

6. The method as recited in claim 1 wherein, in the step (a.2), said two cards are dealt in face down manner.

7. The method as recited in claim 1 wherein, in the step (a.4), said third card is dealt in face down manner.

8. The method as recited in claim 1 wherein, in the step (b.3), said banker's match option further has (iv) all said three cards of said banker in either black color or red color, (v) said cards of said banker forming said paired hand class, (vi) said cards of said banker forming said highest special hand class; (vii) two-categorize parley of (ii) and (iii) categorizes; and (viii) said banker and player tie said main game.

9. The method, as recited in claim 1, wherein in case of no player plays said main game, said side game is played alone by setting one single hand of said banker that two cards are dealt initially as a hand of said banker and said third card is dealt if said point total of said two-card hand is lesser than said pre-set criteria.

10. The method, as recited in claim 1, wherein said four Joker cards are set as even number.

11. The method, as recited in claim 1, wherein said King and Jack are set as odd number while said Queen is set as even number.

12. The method, as recited in claim 1, wherein in said standard hand class, when said point values of said banker and said player are the same, who having a Joker card wins said main game, wherein said banker and said player tie when said point values of said banker and said player are the same, and said banker and said player has no Joker card.

13. The method, as recited in claim 1, wherein only one deck of standard deck plus four Joker cards are used in said card game, such that only 56 cards are used in said card game.

14. The method as recited in claim 1 wherein, in the step (a.4), said banker must draw said third card with said point value between zero and five and stands with said point value with either six or seven.

15. The method, as recited in claim 1, wherein one of said players is assigned as said banker in turn the rest of said players play against said banker.

16. The method, as recited in claim 1, wherein a dealer is assigned as said banker in casino provision.

17. The method, as recited in claim 1, wherein said cards are electronic cards that said card game is played in an electronic game device.

18. The method, as recited in claim 1, wherein said banker and said player tie when both said banker and said player have said highest special hand class.

19. The method, as recited in claim 1, wherein said banker is allowed to play said side game.

20. The method, as recited in claim 1, wherein said card game is played on a table for eight participants including said players and said banker.

* * * * *